United States Patent [19]

Kappler

[11] Patent Number: 4,676,926

[45] Date of Patent: Jun. 30, 1987

[54] METHOD OF REGULATING THE QUALITY OF A FOAM WHEN IT EXITS FROM A FOAM CONVEYOR LINE

[75] Inventor: Gerhard W. Kappler, Bad Liebenzell, Fed. Rep. of Germany

[73] Assignee: Laboratorium Prof. Dr. Rudolf Berthold, Wildbad, Fed. Rep. of Germany

[21] Appl. No.: 753,517

[22] Filed: Jul. 10, 1985

[30] Foreign Application Priority Data

Jul. 11, 1984 [DE] Fed. Rep. of Germany ....... 3425470

[51] Int. Cl.[4] .............................................. B01J 13/00
[52] U.S. Cl. ........................................ 252/307; 8/477; 134/34; 137/4; 222/55; 261/DIG. 26; 426/564
[58] Field of Search ................ 252/307; 261/DIG. 26; 134/34; 137/4; 222/55; 8/477

[56] References Cited

U.S. PATENT DOCUMENTS

| | | | |
|---|---|---|---|
| 3,723,340 | 3/1973 | Shepherd | 252/307 |
| 4,154,537 | 5/1979 | Kress | 134/34 X |
| 4,221,507 | 9/1980 | Olney | 222/55 X |
| 4,316,490 | 2/1982 | Meyer | 222/55 X |
| 4,323,474 | 4/1982 | Hansen et al. | 252/307 |

FOREIGN PATENT DOCUMENTS

| | | |
|---|---|---|
| 83033858 | 12/1983 | Fed. Rep. of Germany . |
| 664756 | 1/1952 | United Kingdom ............. 137/4 |
| 1413981 | 11/1975 | United Kingdom . |
| 1589306 | 5/1981 | United Kingdom ....... 261/DIG. 26 |

OTHER PUBLICATIONS

Europlastics Monthly, 1972, Nov., p. 23, (Abstract).
Kunstst.—Berat, vol. 30, No. 10, pp. 25–26, (Abstract).
Chemical Abstracts V56 No. 3312 e.
Chemical Abstracts V57 No. 1227 e.
Chemical Abstracts V58 No. 13175 e.

Primary Examiner—Richard D. Lovering
Attorney, Agent, or Firm—Armstrong, Nikaido, Marmelstein & Kubovcik

[57] ABSTRACT

In a method for regulating the foam density in products foamed from liquid and a gas additive the density of the foam and the excess pressure are simultaneously measured in the conveyor line of the foam, correlated in an evaluation circuit and the free foam density, that is, the density of the released foam under atmospheric pressure, is calculated therefrom. This calculated value is compared with a set value of the free foam density and in the case of deviations the ratio of the amounts of liquid and gas conveyed is varied.

This method makes it possible for the relative fluctuation in density of the released foam to be reduced to values on the order of 1%.

2 Claims, 1 Drawing Figure

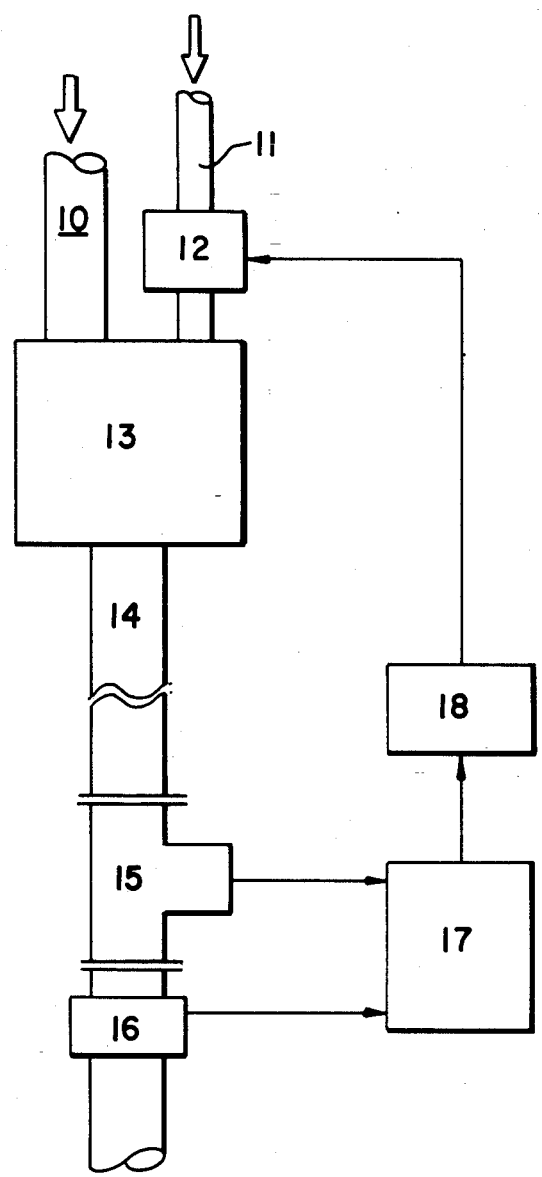

METHOD OF REGULATING THE QUALITY OF A FOAM WHEN IT EXITS FROM A FOAM CONVEYOR LINE

The invention is primarily relative to a method of regulating the quality of a foam when it exits from a foam conveyor line, to which end a liquid and a gas are fed in a regulated manner to a mixer, the foam produced there enters into a foam conveyor line in which its foam density has a value $S_s$ at an excess pressure $P_u$ and whereby the foam then exits into the open, where its free foam density has a value $S_L$ at atmospheric pressure.

Such a method and a device for carrying out this method is known from DE-GM 83 03 385. The device shown in it has the basic function of setting the foam as regards the portions of water/foaming agent/air practically as desired and within broad limits by the independent dosing of water, foaming agent and air over the entire range of the foam spectrum from large bubbles, that is, thin as water, to small bubbles, that is, stiff. A particular task is to set the liquid mixture in such a manner that the smallest possible amount of foaming agent is required to achieve a good and strong development of foam. This thus allows the consistency of the foam to be determined by regulating the specified parameters and also to be made reproducible to a certain extent.

The foam constituting the object of this previously known utility model is used in particular for washing or other cleaning purposes, e.g. for cleaning vehicles or also carpets, that is, as a cleaning agent.

However, the foamed products can also be, for example, food products such as curds, cream or also dye baths for dyeing textiles. It is not sufficient when foaming products of this type to set as precisely as possible the consistency of a foam, i.e. its portion of air bubbles, but it is also important to keep the liter weight of the foamed material and therewith the free foam density as constant as possible. This is desirable in the first two examples in order to achieve an unobjectionable filling of the package with the prescribed amount of product, and in the other example to achieve an even dyeing of the textiles.

The liter weight of the foamed product is varied by decreasing or increasing the rate of flow of the gas, e.g. air. However, this crude method is very imprecise, since the static and dynamic conditions in the mixer and in the subsequent foam line are stable only to a limited degree. For this reason product samples of the foamed material are taken and weighed at frequent intervals of time in methods involving the products cited above. The position of the air dosing valve is then varied as a function of the measured result in the known manner. However, this method requires a lot of time and is also very imprecise, especially since variations in the time intervals between the samplings are not detected.

A device and a method in accordance with the object of utility model G No. 83 03 385 is therefore not sufficient in the case of the given problem to guarantee that the liter weight and the free foam density can be maintained as exactly as possible.

The invention therefore has the task of supplementing the previously known method and device in such a manner that the liter weight (the free foam density) of foamed products can be held constant with great accuracy.

This task is solved by the method of the invention as follows: In order to regulate the free foam density on the foam conveyor line the density $S_s$ of the foam together with the excess pressure $P_u$ is continuously measured, an actual value $S_L^*$ for the free foam density is determined from these values, this actual value $S_L^*$ is compared with a given set value $S_L$ and the gas is added into the mixer in accordance with the deviation of the actual value $L_L^*$ from the set value $S_L$.

The basic concept of the invention is thus to determine the free foam density by means of a coupled measuring of the foam density and of the pressure in the conveyor line by a suitable linking of these measurable variables and to bring this actual value to the given set value of the free foam density by regulating the addition of gas.

To this end a radiometric density measuring system and a pressure measuring device are connected into the foam conveyor line in immediate proximity in the device of the invention in order to carry out this method which regulates the control valve of the gas line via a subsequent evaluation circuit and a regulator.

An embodiment of the invention is described in more detail with reference made to the drawing.

The liquid to be foamed is fed in liquid line 10 to mixer 13 at whose second mixing input gas line 11 terminates. The amount of gas conveyed can be adjusted to the amount of liquid conveyed by regulator valve 12 in gas line 11 as a function of the output of the feed pump (not shown) in the liquid line, so that a certain ratio of these two foam components can be set in mixer 13.

Mixed in this ratio, the foam leaves mixer 13 with a certain excess pressure $P_u$ via foam conveyor line 14.

The invention provides that density measuring system 15 and immediately adjacent to it pressure measuring device 16 are installed in foam conveyor line 14 which measure the density $S_s$ and the excess pressure $P_u$ in the area of the density measuring site. Assuming that the density $S_F$ product (liquid density) can be assumed to be a constant value, the free foam density $S_L$ of the foam, thus, the foam density under atmospheric pressure, can be approximately indicated as follows from the measured values $S_s$ and $P_u$:

$$S_L = \left[ 1 - \frac{S_F - S_s}{S_F - S_s + S_s/(P_u + 1)} \right] S_F$$

Based on this physical relation, the free foam density $S_L$ can be calculated in a subsequent evaluation circuit 17 (after adding in the liquid density $S_F$) using the two measured values $S_s$ and $P_u$ without having to take samples. A microprocessor can be used as the evaluator circuit, which cyclically scans the two measured values under consideration and calculates the free foam density by means of the programmed equation given above. This calculated result represents the actual value of the free foam density. There is then no problem in cyclically comparing this actual value by means of a suitable microprocessor program with the given set value of the free foam density and controlling a regulator 18 in the case of deviations, which for its part adjusts regulating valve 12 of gas conveyor line 11.

EXAMPLE OF AN EMBODIMENT

A system in which the foamed product is a dye bath operates with a flow of approximately 600 l/h and a free foam density $S_L$ of 50–180 g/l. The density measuring system is a L.B 379 radiometric measuring system of the company Laboratorium Prof. Dr. Berthold in 7547 Wildbad. The measuring amplifier of this L.B 379 density measuring system is used as evaluation circuit 17 in such a manner that the measuring input provided for temperature conpensation is connected to a membrane pressure recorder as pressure measuring device 16 and the calibration characteristic of the temperature compensation is modulated to the equation given above for the free foam density. Given a corresponding scale calibration, the free foam density $S_L$ can then be read on the measuring amplifier. In this device customary in trade its systems present for temperature compensation are thus used for "pressure compensation" in accordance with the equation given above.

In the membrane pressure receiver used thereby an input current of 0.4 m A corresponds to a pressure of 1 kg/cm². The current input of the measuring amplifier customarily used for temperature compensation is consequently loaded with a pressure signal in the range of 0/4–20 m A.

The "pressure-connected" actual value of the free foam density $S_L$ gained in this manner is then fed to regulator 18 of the PID type as an output quantity and compared there with the set value to be set in regulator 18. The regulated quantity for regulator valve 12 in the gas conveyor line is extracted in regulator 18 from the differential signal.

With this arrangement the variations of the free foam density $\Delta S_L$ in the example given above can be limited to a value of $<+/-1$ g/l. The relative variation $\Delta S_L/S_L$ is therefore only on the order of 1%. This is especially indicated when different outputs are required: Regulator valve 12 is automatically "made to follow" by the loop, so that foam density $S_L$ is held constant.

I claim:

1. A method for controlling the free foam density of a foamed product formed by combining a liquid of known density $S_F$ and a gas in a mixing means and discharging through a foam conveyor line comprising:
    (a) providing a means for introducing gas into a mixer;
    (b) continuously measuring both the density $S_s$ and the pressure $P_u$ of a foam in immediately adjacent locations in a foam conveyor line;
    (c) calculating the actual value $S_L^*$ for said free foam density $S_L$ from the measurements of $S_s$ and $P_u$ according to the relationship $$S_L^* = \left[ 1 - \frac{S_F - S_s}{S_F - S_s + (S_s/P_u + 1)} \right] S_F;$$

(d) comparing the actual value $S_L^*$ with the desired set value $S_L$; and
    (e) adjusting the means for introducing gas into the mixer to cause $S_L^*$ to be equivalent to S.

2. A method for controlling the free foam density of a foamed product formed by combining a liquid and a gas in a mixing means and discharged through a foam conveyor line comprising:
    (a) providing a regulator valve in a gas feed line leading to a mixer;
    (b) continuously measuring the density of $S_s$ of a foam in a foam conveyor line using a radiometric density measuring device;
    (c) continuously measuring the pressure Pu in the foam conveyor line;
    (d) calculating the free foam density $S_L^*$ from the density $S_s$ and the pressure Pu in a microprocessor;
    (e) comparing the free foam density $S_L^*$ with the desired set value $S_L$ and determining in a microprocessor whether more or less gas is required; and
    (f) signaling a means for controlling said regulator valve to adjust said valve to increase or to decrease the flow of said gas through said valve.

* * * * *

UNITED STATES PATENT AND TRADEMARK OFFICE
CERTIFICATE OF CORRECTION

PATENT NO. : 4,676,926
DATED : June 30, 1987
INVENTOR(S) : Gerhard W. Kappler

It is certified that error appears in the above-identified patent and that said Letters Patent is hereby corrected as shown below:

Column 2, line 9, change ""$L_L$*" to ---$S_L$*---.

Column 3, lines 2 and 4, change "L.B.379" to ---LB 379---.

Column 3, line 3, change "7547" to ---D-7547---.

Column 4, line 6, after "the", insert ---excess---.

Signed and Sealed this

Twenty-first Day of June, 1988

Attest:

DONALD J. QUIGG

Attesting Officer      Commissioner of Patents and Trademarks

UNITED STATES PATENT AND TRADEMARK OFFICE
CERTIFICATE OF CORRECTION

PATENT NO. : 4,676,926
DATED : June 30, 1987
INVENTOR(S) : Gerhard W. KAPPLER

It is certified that error appears in the above-identified patent and that said Letters Patent is hereby corrected as shown below:

Column 4, line 13, the formula should read:

$$--S_L^* = \left[ 1 - \frac{S_F - S_s}{S_F - S_s + S_s/(P_u + 1)} \right] S_F--.$$

Signed and Sealed this

Sixth Day of September, 1988

*Attest:*

DONALD J. QUIGG

*Attesting Officer*     *Commissioner of Patents and Trademarks*